(12) United States Patent
Burtchen et al.

(10) Patent No.: US 8,829,399 B2
(45) Date of Patent: Sep. 9, 2014

(54) DEVICE FOR HEATING AND METHOD FOR HEATING

(75) Inventors: Marco Burtchen, Lippstadt (DE); Michael Jung, Würzburg (DE)

(73) Assignee: Aktiebolaget SKF, Gothenburg (SE)

( * ) Notice: Subject to any disclaimer, the term of this patent is extended or adjusted under 35 U.S.C. 154(b) by 418 days.

(21) Appl. No.: 12/922,061

(22) PCT Filed: Mar. 11, 2009

(86) PCT No.: PCT/EP2009/001737
§ 371 (c)(1),
(2), (4) Date: Jan. 31, 2011

(87) PCT Pub. No.: WO2009/112247
PCT Pub. Date: Sep. 17, 2009

(65) Prior Publication Data
US 2011/0174806 A1  Jul. 21, 2011

(30) Foreign Application Priority Data

Mar. 14, 2008  (DE) .......................... 10 2008 014 165

(51) Int. Cl.
| | |
|---|---|
| H05B 6/42 | (2006.01) |
| H05B 6/36 | (2006.01) |
| H05B 6/12 | (2006.01) |
| H05B 6/10 | (2006.01) |
| C21D 9/28 | (2006.01) |
| C21D 9/22 | (2006.01) |
| C21D 9/06 | (2006.01) |
| F16C 33/00 | (2006.01) |
| A47B 88/00 | (2006.01) |
| F16C 19/00 | (2006.01) |
| F16C 19/24 | (2006.01) |
| F16C 13/00 | (2006.01) |
| C21D 9/40 | (2006.01) |
| C21D 1/10 | (2006.01) |
| F16C 33/64 | (2006.01) |
| H05B 6/38 | (2006.01) |
| F16C 19/36 | (2006.01) |

(52) U.S. Cl.
CPC .. *C21D 1/10* (2013.01); *C21D 9/40* (2013.01); *F16C 33/64* (2013.01); *H05B 6/38* (2013.01); *F16C 19/364* (2013.01)
USPC ........... 219/677; 219/624; 219/635; 219/639; 219/640; 219/672; 219/673; 219/674; 148/572; 148/573; 148/569; 384/625; 384/19; 384/50; 384/548

(58) Field of Classification Search
USPC ......... 219/624, 635, 639, 640, 672, 673, 674, 219/677; 148/572, 573, 567, 569; 384/625, 384/19, 50–59, 548–589
See application file for complete search history.

(56) References Cited

U.S. PATENT DOCUMENTS

| | | | | |
|---|---|---|---|---|
| 2,457,845 | A | * | 1/1949 | Strickland, Jr. ................ 219/644 |
| 3,737,613 | A | * | 6/1973 | Gillock ......................... 219/652 |

(Continued)

FOREIGN PATENT DOCUMENTS

| | | |
|---|---|---|
| DE | 132356 A1 | 9/1978 |
| DE | 3125450 A1 | 3/1982 |

(Continued)

*Primary Examiner* — Dana Ross
*Assistant Examiner* — Gyounghyun Bae
(74) *Attorney, Agent, or Firm* — Bryan Peckjian; SKF USA Inc. Patent Department

(57) ABSTRACT

A method and device for heating or hardening at least an axial segment of a rotationally-symmetric surface of a work piece includes rotating the work piece about its rotational axis and moving a peripheral portion of an inductor along a longitudinal profile of the axial segment of the rotating work piece with a constant spacing between the peripheral portion and the axial segment. At least a portion of the movement of the peripheral portion is composed of a first vector component in the direction of the rotational axis and a second component extending perpendicularly to the first vector component. The peripheral portion has a length in the rotational axis direction that is less the length of the axial segment in the rotational axis direction.

23 Claims, 1 Drawing Sheet

(56) References Cited

U.S. PATENT DOCUMENTS

| | | | |
|---|---|---|---|
| 4,150,278 A * | 4/1979 | Resener | 219/121.69 |
| 4,401,485 A * | 8/1983 | Novorsky | 148/571 |
| 4,481,397 A * | 11/1984 | Maurice et al. | 219/645 |
| 4,625,090 A * | 11/1986 | Pfaffmann et al. | 219/644 |
| 4,675,488 A * | 6/1987 | Mucha et al. | 219/640 |
| 4,949,758 A | 8/1990 | Bear | |
| 5,336,338 A * | 8/1994 | Toda | 148/319 |
| 6,158,263 A * | 12/2000 | Maeda et al. | 72/237 |
| 6,423,158 B1 * | 7/2002 | Maeda et al. | 148/319 |
| 6,548,793 B1 * | 4/2003 | Smith | 219/640 |
| 6,873,239 B2 * | 3/2005 | Decristofaro et al. | 336/178 |
| 7,004,637 B1 * | 2/2006 | Uyama et al. | 384/544 |
| 7,651,275 B2 * | 1/2010 | Kametaka et al. | 384/544 |
| 7,857,521 B2 * | 12/2010 | Umekida et al. | 384/572 |
| 8,186,885 B2 * | 5/2012 | Umekida et al. | 384/504 |
| 2005/0141799 A1 * | 6/2005 | Uyama et al. | 384/544 |
| 2005/0236401 A1 * | 10/2005 | Davids et al. | 219/635 |
| 2009/0046972 A1 * | 2/2009 | Umekida et al. | 384/571 |
| 2011/0069919 A1 * | 3/2011 | Umekida et al. | 384/544 |

FOREIGN PATENT DOCUMENTS

| | | |
|---|---|---|
| DE | 102006041696 A1 | 3/2008 |
| DE | 102007014637 A1 | 10/2008 |
| GB | 2079659 A | 1/1982 |
| JP | 2006244421 A | 9/2006 |
| JP | 2006344421 A | 12/2006 |
| WO | WO2008028638 A1 | 3/2008 |

* cited by examiner

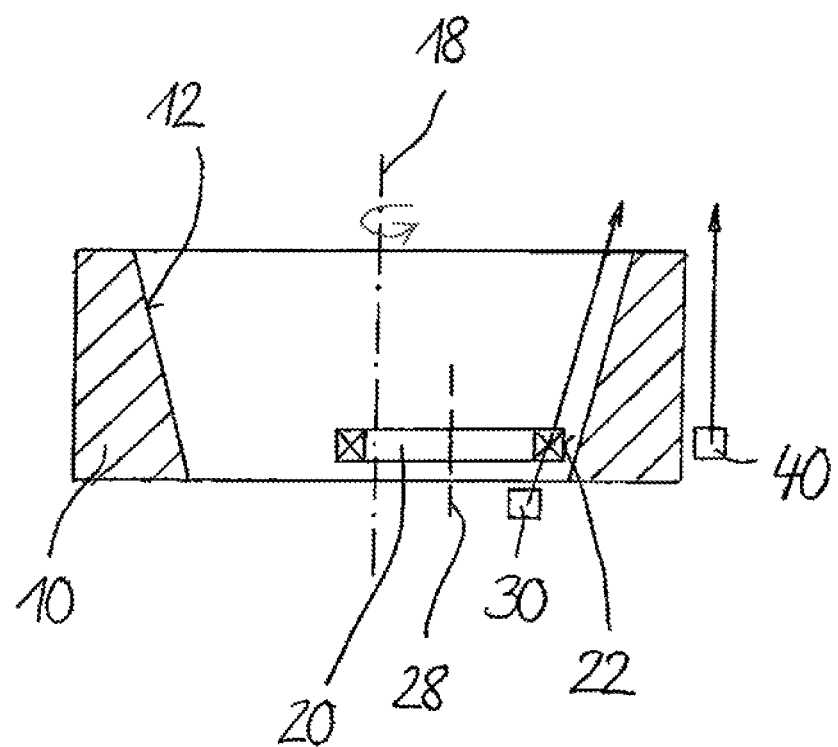

DEVICE FOR HEATING AND METHOD FOR HEATING

CROSS-REFERENCE

This application is the U.S. national stage of International Application No. PCT/EP2009/001737 filed on Mar. 11, 2009, which claims priority to German patent application no. 10 2008 014 165.8 filed on Mar. 14, 2008.

TECHNICAL FIELD

The invention concerns a device for heating at least an axial segment of a rotationally-symmetric surface of a work piece as well as a corresponding method.

RELATED ART

Roller hearth furnaces are known from the prior art, in which work pieces that will be, in particular, through-hardened, e.g., roller bearing rings, move through the oven in a longitudinal direction and are, among other things, thereby heated in a predetermined manner and way. A quenching following the heating process then leads to the desired, e.g., martensitic through-hardening.

SUMMARY

In one aspect of the present teachings, an improved device and method are provided for heating and/or hardening at least a surface or surface layer of a work piece.

In another aspect of the present teachings, a device for heating and/or hardening at least an axial segment of a rotationally-symmetric surface of a work piece includes the following features:
  rotating means, by which the work piece is movable into rotation about its rotational axis, and
  an inductor, whose axial length is smaller in at least one area, which is provided to oppose the segment, than an axial length of the segment, which inductor has a portion, provided to oppose the segment with a defined spacing, and which inductor is formed in an axially movable manner such that said portion is displaceable along a longitudinal profile of the segment with a defined spacing.

According to well-known induction hardening methods, an annular induction coil generally passes over the to-be-hardened circular-cylindrical ring in an axial direction (feeding method) or an induction ring coil, which is shaped so as to follow the contour of the to-be-hardened ring, is placed on the outer or inner surface of the to-be-hardened ring (entire surface hardening). For this purpose, a frequency-dependent coupling distance must be maintained at all times, in order to produce a sufficient induction of the eddy current in the surface layer of the to-be-hardened ring. The induction coil and the to-be-hardened ring are concentrically disposed for this purpose. The use of a rigid induction coil has been excluded thus far when, in certain types of to-be-hardened rings having a non-cylindrical contour, the contour change was larger than the coupling distance and an axial movement of the induction coil was impossible due to rims and undercuts on the to-be-hardened ring. The above-mentioned limitations are advantageously overcome with the inventive device. The displacement along the longitudinal contour with a defined spacing takes place with the inventive device, in particular in terms of a numerical control.

Furthermore, in an exemplary embodiment, through-hardening is advantageously not performed, but rather only the surface layers are hardened as a consequence of a corresponding heating, so that, in addition to a shorter hardening time period relative to the through-hardening, a high durability of the working piece core is maintained and it also involves a reduced energy consumption relative to the through-hardening in an especially environmentally-friendly manner.

Further advantages, features and details of the invention result from the exemplary embodiment of the invention described in the following with the assistance of the FIGURE.

BRIEF DESCRIPTION OF THE DRAWINGS

A representative embodiment according to the present teachings is shown in the sole FIGURE.

DETAILED DESCRIPTION OF THE INVENTION

The FIGURE shows a cross section through a representative device for hardening surface layer-like areas of a roller surface 12 for tapered rollers of a tapered roller bearing outer ring 10. For this purpose, the tapered roller bearing outer ring 10 is disposed in the device such that its rotational axis 18 is oriented vertically. Moreover, the device preferably includes rotating means, not described in a detailed manner and way; the tapered roller bearing outer ring 10 is rotated rapidly about its rotational axis 18 by the rotating means during the surface layer hardening, so that homogenous heating is achieved over the circumference of the roller surface 12 during the heating.

Furthermore, the device includes a one-winding annular inductor 20. The inductor 20 is formed such that its outer diameter is smaller than the smallest inner diameter of an entire spectrum of types of tapered roller bearing outer rings having a wide variety of dimensions, including the tapered roller bearing outer ring 10. For heating the roller surface 12 of the tapered roller bearing outer ring 10, the inductor 20 is energized with an appropriate electric current and moves upwardly from the bottom in accordance with the oblique arrow depicted in the FIGURE.

The central axis 28 of the annular inductor 20 is disposed both parallel to and spaced apart from the rotational axis 18 of the tapered roller bearing outer ring 10, so that the inductor 20 has a circumferential portion 22, which opposes the roller surface 12 with a defined, especially minimal spacing. For the heating, this circumferential portion 22 is moved upwardly from the bottom along the contour of the roller surface 12 with an unchanged spacing relative to the roller surface 12 in accordance with the arrow direction depicted in the FIGURE.

A quenching apparatus 30 tracks said circumferential portion 22 of the inductor 20 in accordance with the movement of said circumferential portion 22, wherein the quenching apparatus 30 is disposed underneath the inductor 20 and quenching is performed, e.g., using a polymer-/water mixture or a spray quenching is performed using a gas-/liquid mixture, so that the corresponding roller surface segment is quenched subsequent to the heating and therefore is hardened in a desired manner. Due to the approximately vertically-oriented rotational axis 18 of the tapered roller bearing outer ring 10 together with the arrangement of the quenching apparatus 30 underneath the inductor 20, undesired cooling of still-to-be-heated and/or to-be-hardened areas of the roller surface 12, which are disposed just above, e.g., by downward-flowing quenching liquid is advantageously prevented.

In order to achieve defined predetermined hardening depth progressions, a cooling device 40 can be utilized, for example, on the outer surface of the tapered roller bearing outer ring 10; the cooling device 40 is disposed approximately at the same height as said circumferential portion 22 of the inductor 20 and, during the heating, is moved upwardly from the bottom, synchronously with the movement of said circumferential portion 22, in accordance with the arrow direction depicted in the FIGURE for simultaneously cooling the outer surface.

In another exemplary embodiment, temperature measuring means can be provided at defined portions of the tapered roller bearing outer ring 10, in particular for controlling and/or regulating the position of the inductor 20 and/or its induction power; the online measurement results of the temperature measuring means serve as input values of said controller and/or regulator.

With the above-described device, it is advantageously possible to harden several hundred types of tapered roller bearing rings, which are dimensioned and formed in the widest variety of ways and have a diameter of 200 to 600 mm, using one and the same device. Furthermore, it is, of course, also possible to select a suitably dimensioned inductor from a limited set depending on the particular type of tapered roller bearing ring.

In other embodiments, it is, of course, also possible to harden complex longitudinal contours, e.g., the outer surface of a tapered roller bearing inner ring, which is formed with a type of rim on both axial ends in a known manner. For this purpose, said circumferential portion of the inductor can be disposed radially outward on the outer surface of the tapered roller bearing inner ring and can move along the contour with a defined spacing relative to the outer surface of the tapered roller bearing inner ring in terms of a numerical control. Moreover, the device can, of course, also comprise fixing devices for the work piece, so that warping of the work piece during quenching is advantageously prevented.

The invention claimed is:

1. A heating device comprising:
an inductor having a movable peripheral portion configured to heat at least an axial segment of a rotationally-symmetric surface of a work piece while the work piece is rotating about a work piece rotational axis, wherein the peripheral portion has an axial length in the direction of the work piece rotational axis that is less than the length of the axial segment in the work piece rotational axis direction, and
a controller configured to move the inductor at an acute angle relative to the work piece rotational axis while maintaining a defined spacing between the inductor and the work piece.

2. A device according to claim 1, wherein the inductor has an annular outer periphery.

3. A device according to claim 1, wherein the inductor is a one-winding induction coil.

4. A device according to claim 1, wherein the inductor is configured to heat the work piece with the work piece rotational axis oriented at least substantially vertically.

5. A device according to claim 4, wherein the inductor is configured to move generally upwardly in the vertical direction starting from a lowermost portion of the work piece.

6. A device according to claim 1, further comprising a quenching apparatus configured to move so as to follow the movement of said periphery portion of the inductor in a corresponding manner.

7. A device according to claim 6, wherein the quenching apparatus is disposed below the inductor in the vertical direction.

8. A device according to claim 1, further comprising a cooling device configured to move in correspondence with said peripheral portion of the inductor along a side of the work piece that is opposite of the side being heated by the inductor.

9. A device according to claim 8, further comprising a quenching apparatus disposed below the inductor in the vertical direction and configured to move so as to follow the movement of said periphery portion of the inductor in a corresponding manner, wherein the inductor is an annular one-winding induction coil and is configured to heat the work piece with its rotational axis being vertically oriented.

10. The heating device according to claim 1, wherein the defined spacing is a constant spacing.

11. A method for heating at least an axial segment of a rotationally-symmetric surface of a work piece comprising:
rotating the work piece about its rotational axis, and
moving a peripheral portion of an inductor along a longitudinal profile of the axial segment of the rotating work piece with a constant spacing between the peripheral portion and the axial segment while energizing the inductor so as to heat the axial segment, at least a portion of the movement of the peripheral portion being composed of a first vector component in the direction of the work piece rotational axis and a second vector component extending perpendicularly to the first vector component, wherein the peripheral portion has a length in the work piece rotational axis direction that is less than the length of the axial segment in the work piece rotational axis direction.

12. A method according to claim 11, wherein the rotational axis of the rotating work piece is oriented at least substantially vertically.

13. A method according to claim 12, wherein the inductor is moved upwardly generally in the vertical direction starting from a vertically lowermost portion of the rotating work piece.

14. A method according to claim 11, further comprising moving a quenching apparatus in synchrony with the peripheral portion of the inductor so as to follow the movement of the peripheral portion in a corresponding manner.

15. A method according to claim 11, wherein the work piece is hollow and the method further comprises cooling an outer surface of the work piece, which is opposite of the side of the work piece being heated by the inductor, by moving a cooling device in correspondence with the movement of the peripheral portion of the inductor.

16. A method according to claim 11, wherein the axial segment does not have a circular cylinder shape.

17. A method according to claim 11, wherein the axial segment has a conical surface.

18. A method according to claim 11, wherein the axial segment is a conical inner surface of a substantially cylindrical, hollow work piece and an outer circumference of the inductor has a smaller diameter than the conical inner surface of the work piece.

19. A method according to claim 18, wherein the work piece is a ring of a tapered roller bearing and the axial segment comprises a rolling surface area of a track of the ring.

20. A method according to claim 19, wherein the rotational axis of the rotating tapered roller bearing ring is oriented vertically and the inductor is moved upwardly generally in the vertical direction starting from a vertically lowermost portion of the rotating tapered roller bearing ring.

21. A method according to claim 20, further comprising:
moving a quenching apparatus in synchrony with the peripheral portion of the inductor so as to follow the movement of the peripheral portion in a corresponding manner and simultaneously cooling a surface of the rotating tapered roller bearing ring, which surface is opposite of the side of the rotating tapered roller bearing ring being heated by the inductor, by moving a cooling device in correspondence with the movement of the peripheral portion of the inductor, wherein the heating is sufficient to harden at least a surface layer of the rolling surface area.

22. A method for heating comprising:

providing a work piece having an axis of symmetry and a rotationally symmetric surface surrounding the axis of symmetry, the rotationally symmetric surface including an axial segment angled at an acute angle relative to the axis of symmetry, the axial segment having a length;

providing an inductor having a peripheral portion having a thickness less than the length;

energizing the inductor;

rotating the work piece about the rotational axis; and moving the peripheral portion of the energized inductor along the axial segment of the rotating work piece while maintaining a defined spacing between the peripheral portion and the axial segment to heat the axial segment.

23. The method of claim 22 wherein the defined spacing comprises a constant spacing.

* * * * *